United States Patent
Hori

(10) Patent No.: US 6,260,946 B1
(45) Date of Patent: Jul. 17, 2001

(54) MULTIFUNCTION PRINTING DEVICE CAPABLE OF SELECTING PRINTING METHOD ACCORDING TO FREE SPACE IN MEMORY

(75) Inventor: Masaaki Hori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/281,931

(22) Filed: Mar. 31, 1999

(30) Foreign Application Priority Data

Apr. 1, 1998 (JP) .................................. 10-107099

(51) Int. Cl.[7] ...................................................... B41J 2/15
(52) U.S. Cl. ................................................ 347/41; 347/5
(58) Field of Search ................................ 347/5, 15, 41, 347/43, 183, 14; 358/1.16, 1.9, 1.2; 400/625

(56) References Cited

U.S. PATENT DOCUMENTS

| | | | |
|---|---|---|---|
| 4,768,164 | * 8/1988 | Dreher | .................................... 400/83 |
| 5,506,609 | * 4/1996 | Claassen | .................................. 347/41 |
| 5,610,634 | * 3/1997 | Murata et al. | ........................... 347/41 |
| 5,696,888 | * 12/1997 | Ikeda | ..................................... 395/102 |
| 6,089,697 | * 7/2000 | Tajika et al. | ............................ 347/43 |

FOREIGN PATENT DOCUMENTS

| | | |
|---|---|---|
| 0 745 485 A2 | 12/1996 | (EP) . |
| 8-324025 | 12/1996 | (JP) . |
| 9-258924 | 10/1997 | (JP) . |
| 10-138529 | 5/1998 | (JP) . |
| 10-193691 | 7/1998 | (JP) . |

* cited by examiner

Primary Examiner—Thinh Nguyen
Assistant Examiner—Lamson D. Nguyen
(74) Attorney, Agent, or Firm—Oliff & Berridge, PLC.

(57) ABSTRACT

In order to select an interlace printing method, first, a resolution for a video print process is specified. Next, the actual amount of the free space in the shared area 33b of the RAM is detected. Then, the printing methods available are detected from Table 1. The printing method that uses the greatest number of ink jet nozzles is selected from the printing methods detected. Then, the video printing operation is executed using the selected printing method.

16 Claims, 7 Drawing Sheets

TABLE 1

| | RESOLUTION (WIDTHWISE × LENGTHWISE) [dpi] | TOTAL NUMBER OF NOZZLES TO USE [NUMBER OF NOZZLES × NUMBER OF COLOR] | REQUIRED CAPACITY AVAILABLE IN FREE AREA [KB] |
|---|---|---|---|
| VIDEO PRINT PROCESS | 360 × 360 | 64 × 4 | 410 |
| | 360 × 720 | 64 × 4 | 602 |
| | | 32 × 4 | 410 |
| | 720 × 720 | 32 × 4 | 794 |
| | | 16 × 4 | 554 |
| | | 8 × 4 | 410 |
| | 1440 × 720 | 16 × 4 | 794 |
| | | 8 × 4 | 554 |

TABLE 2

| | RESOLUTION (WIDTHWISE × LENGTHWISE) [dpi] | TOTAL NUMBER OF NOZZLES TO USE [NUMBER OF NOZZLES × NUMBER OF COLOR] | REQUIRED CAPACITY AVAILABLE IN FREE AREA [KB] |
|---|---|---|---|
| COPY PROCESS | 360 × 360 | 64 × 4 | — |
| | 360 × 720 | 64 × 4 | 192 |
| | | 32 × 4 | — |
| | 720 × 720 | 64 × 4 | 864 |
| | | 32 × 4 | 384 |
| | | 16 × 4 | 144 |
| | | 8 × 4 | — |
| | 1440 × 720 | 32 × 4 | 864 |
| | | 16 × 4 | 384 |
| | | 8 × 4 | 144 |

FIG. 5 (a)

TABLE 1

| | RESOLUTION (WIDTHWISE×LENGTHWISE) [dpi] | TOTAL NUMBER OF NOZZLES TO USE [NUMBER OF NOZZLES ×NUMBER OF COLOR] | REQUIRED CAPACITY AVAILABLE IN FREE AREA [KB] |
|---|---|---|---|
| VIDEO PRINT PROCESS | 360×360 | 64×4 | 410 |
| | 360×720 | 64×4 | 602 |
| | | 32×4 | 410 |
| | 720×720 | 32×4 | 794 |
| | | 16×4 | 554 |
| | | 8×4 | 410 |
| | 1440×720 | 16×4 | 794 |
| | | 8×4 | 554 |

FIG. 5 (b)

TABLE 2

| | RESOLUTION (WIDTHWISE×LENGTHWISE) [dpi] | TOTAL NUMBER OF NOZZLES TO USE [NUMBER OF NOZZLES ×NUMBER OF COLOR] | REQUIRED CAPACITY AVAILABLE IN FREE AREA [KB] |
|---|---|---|---|
| COPY PROCESS | 360×360 | 64×4 | — |
| | 360×720 | 64×4 | 192 |
| | | 32×4 | — |
| | 720×720 | 64×4 | 864 |
| | | 32×4 | 384 |
| | | 16×4 | 144 |
| | | 8×4 | — |
| | 1440×720 | 32×4 | 864 |
| | | 16×4 | 384 |
| | | 8×4 | 144 |

MULTIFUNCTION PRINTING DEVICE CAPABLE OF SELECTING PRINTING METHOD ACCORDING TO FREE SPACE IN MEMORY

BACKGROUND OF THE INVENTION

1. Field of the Invention

The present invention relates to a multifunction printing device including a plurality of data receiving units, wherein data received by a plurality of data receiving units is processed using a shared pool of a memory.

2. Description of the Related Art

There has been known a conventional multifunction printing device provided with a variety of different functions, such as a copy function, a video print function, a facsimile function, and an answering machine function. The multifunctions printing device receives a variety types of image data using a plurality of different data receiving units, such as a PC interface, an image scanner, a facsimile modem, and a video output terminal. The received image data is stored in a RAM provided to the multifunction printing device while processed into print data. Then, the multifunction printing device executes printing operations for forming an image based on the print data.

Also, voice data can be received as a message from an incoming caller. The voice data is stored in a shared pool of memory in the RAM.

Because the multifunction printing device is provided with a variety of different functions, there is an increasing demand for the multifunction printing device, particularly, in small offices.

However, in order to reduce production costs of the multifunction printing device, a pool of memory of the RAM is shared by the plurality of functions to process various data. Therefore, when a great deal of data needs to be processed by the different functions at the same time, there may be insufficient free space in the shared pool of memory. For example, when the video print function is executed to print a video image based on video image data, a large amount of voice data may be stored in the shared pool of memory. As a result, sufficient free space in the share pool may not be available to process the video image data at a desired resolution. In this case, the video image data is processed at a resolution compulsorily reduced depending on the amount of a free space of the shared pool. Therefore, the video image is printed out at a resolution other than the resolution desired by a user.

SUMMARY OF THE INVENTION

It is an objective of the present invention to overcome the above problems and also to provide a multifunction printing device capable of printing images at a desired resolution even if insufficient free space is available in a shared pool of memory.

In order to achieve the above and other objects of the present invention, there is provided a multifunction printing device including a sheet feed unit, a printer, a first memory, a plurality of receiving units, a specify unit, a detection unit, a selecting unit, and a process unit. The sheet feed unit that a recording medium in a first direction. The that executes printing operations using an interlace printing method to form an image on the recording sheet. The printer includes a transport unit and a print head. The transport unit reciprocally moves the print head in a second direction. The print head has a nozzle surface formed with a plurality of ink jet nozzles aligned in a row at a predetermined pitch in the first direction. The printer forms the image by selectively ejecting ink droplets from the ink jet nozzles toward the recording sheet. The first memory stores data, and the plurality of receiving units receives data. The specify unit specifies a resolution, the detection unit detects amount of a free space in the first memory. The selecting unit selects the interlace printing method in accordance with the amount of the free space in the first memory. The process unit processes, using the first memory, the received data based on the selected interlace printing method. The printer executes the printing operations at the resolution specified by the specify unit based on the data processed by the process unit.

There is also provided a method of controlling a multifunction printing device. The method includes the steps of (a) specifying a resolution; (b) receiving image data; (c) detecting amount of a free space of a first memory; (d) setting the resolution specified in step (a) and the amount of the free space detected in step (c) as parameters; (d) searching out one of interlace printing methods stored in a second memory based on the parameters; and (e) processing the data received in step (b) into print data using the first memory based on the interlace print method searched out in step (d).

Further, there is provided a medium storing a program of controlling a multifunction printing device. The program includes the programs of (a) specifying a resolution (b) receiving image data; (c) detecting amount of a free space of a first memory; (d) setting the resolution specified in program (a) and the amount of the free space detected in program (c) as parameters; (e) searching out one of interlace printing methods from a second memory based on the parameters; and (f) processing the data received by receiving program (b) into prong data using the first memory based on the interlace print method searched out by the searching program (e).

An example will be described for when a print head is formed with 64 ink nozzles aligned in a row at a $1/180$ inch pitch. In this case, when a resolution of (720×720) dpi is specified, a four-pass interlace printing method is used. At this time, using all 64 ink jet nozzles will require a fairly large amount of free space in the shared pool of memory. If it is determined that the amount of free space is less than the required amount, then the number of the ink jet nozzles used for printing will be reduced, for example, to 32 or 16 nozzles. Although printing speed will be reduced, an image at the desired resolution can be formed without image quality being degraded. In this way, printing can be performed at a desired resolution using a method selected in accordance with the amount of free space in the shared pool of memory.

BRIEF DESCRIPTION OF THE DRAWINGS

The particular features and advantages of the invention as well as other objects will become more apparent from the following description taken in connection with the accompanying drawings, in which:

FIG. 5(a) is a graphical representation of a Table 1 stored in a ROM of the multifunction printing device;

FIG. 5(b) is a graphical representation of a Table 2 stored in the ROM;

DETAILED DESCRIPTION OF THE PREFERRED EMBODIMENT

A multifunction printing device 1 according to a preferred embodiment of the present invention will be described while referring to the accompanying drawings.

Figure 1:
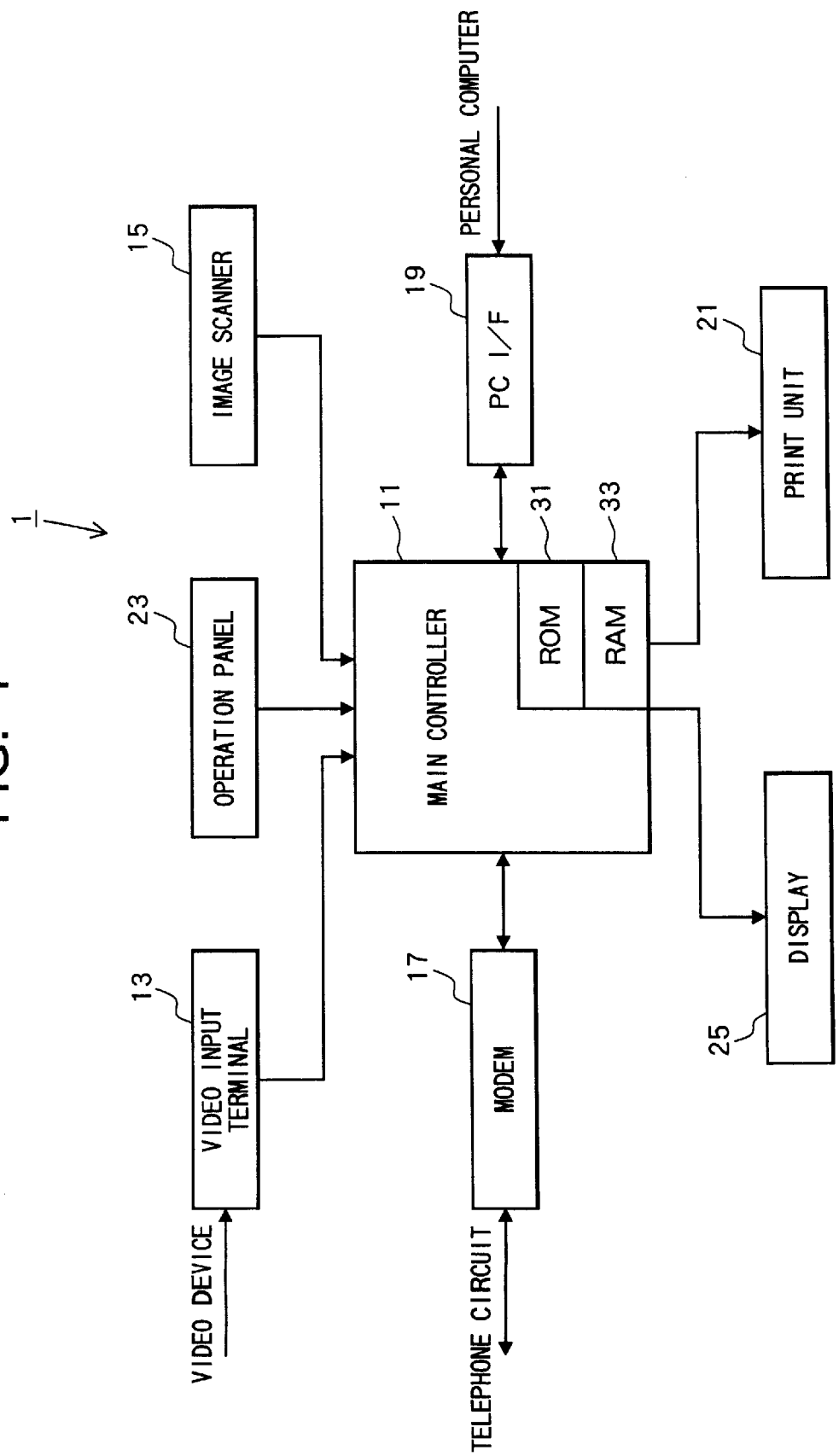
FIG. 1 is a block diagram schematically showing a configuration of a multifunction printing device according to an embodiment of the present invention.

As shown in FIG. 1, the multifunction printing device 1 includes a main controller 11 for executing a variety of different control processed. The multifunction printing device 1 also includes a video input terminal 13, a modem 17, an image scanner 15, a PC interface 19, a print unit 21, an operation panel 23, and a display 25, all connected to the main controller 11. The video input terminal 13 is for receiving video image data from an external video device and outputting the video image data to the main controller 11. The image scanner 15 is for retrieving image data from an original document and outputting the image data to the main controller 11. The modem 17 is connected to a telephone circuit for transmitting facsimile data between the telephone circuit and the main controller 11. The PC interface 19 is connected to a personal computer for transmitting print data between the personal computer and the main controller 11. The print unit 21 is for performing printing operations for forming images on a recording sheet based on data, which is received from any one of the video input terminal 13, the image scanner 15, the modem 17, and the PC interface 19. The operation panel 23 is for selecting a variety of functions to be executed. The display 25 is for displaying a variety of different messages. It should be noted that the multifunction printing device 1 further includes an answering machine function.

The main controller 11 performs a variety of different processes, for example, a print process, a facsimile transmission process, and an answering machine process. Specifically, the print process is for printing images on a recording sheet based on print data received from the personal computer. The video print process is for printing video images on a recording sheet based on video image data inputted from the video input terminal 13. The copy process is for retrieving image data using the image scanner 15 and forming an image on a recording sheet based on the retrieved image data. The facsimile print process is for forming an image based on facsimile data received from the modem 17. The facsimile transmission process is for converting image data retrieved by the image scanner 15 into facsimile transmission data and transmitting the facsimile image data over the modem 17 to the telephone circuit. The answering machine processes is for recording voice data inputted over the modem 17 when the answering machine function is ON.

The main controller 11 includes a read only memory (ROM) 31 and a random access memory (RAM) 33. The ROM 31 stores programs, data required for executing these processes, and search tables. The programs are for used by the main controller 11 to execute the above-described processes. The RAM 33 is used for storing and processing data during the processes.

Figure 2:
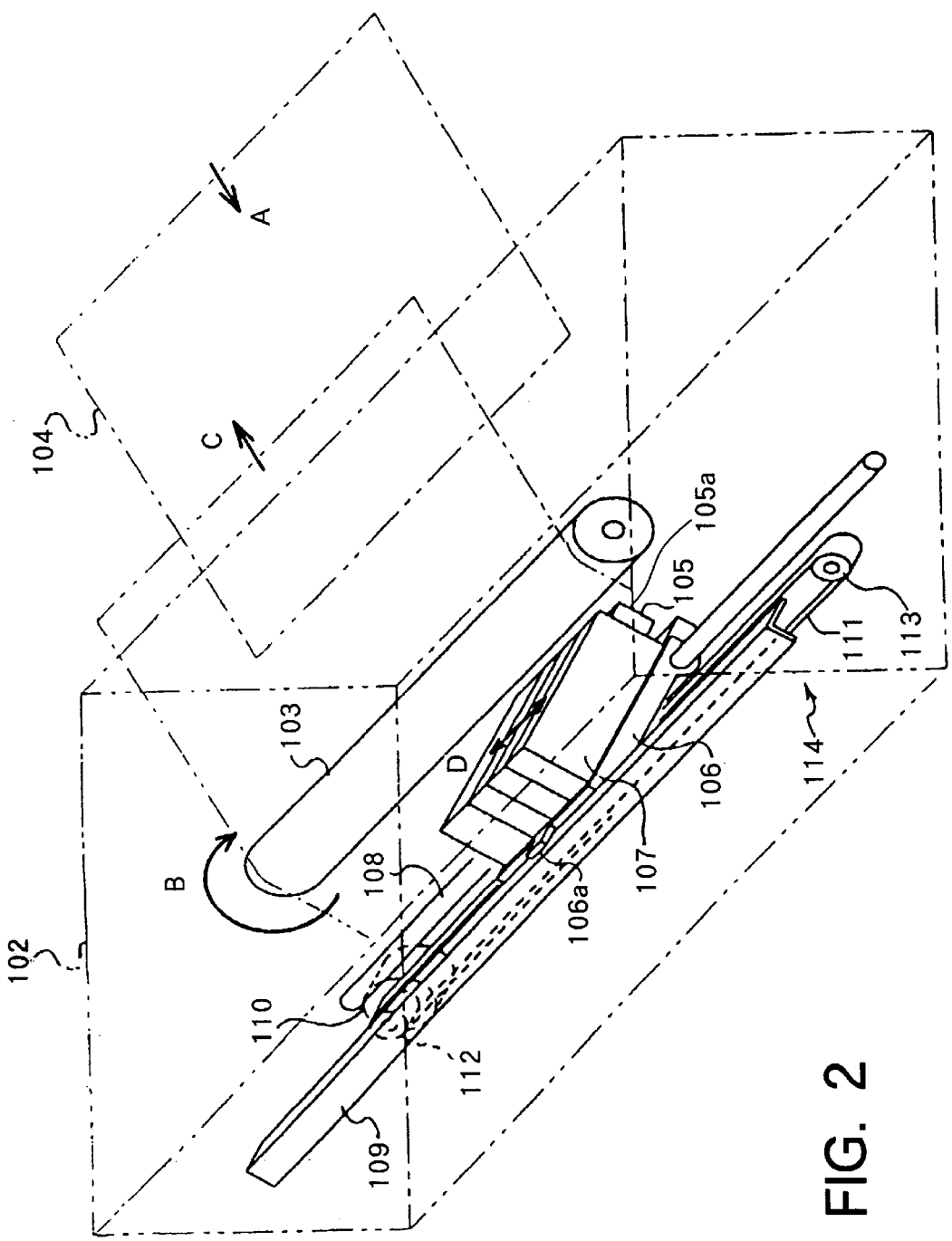
FIG. 2 is a perspective view, partially in phantom, showing a print unit provided to the multifunction printing device.

Next, the print unit 21 will be described while referring the FIG. 2. The print unit 21 includes a frame 102, a platen roller 103, a print head 105 having nozzle surfaces 105a, a carriage 106 having a joint portion 106a, ink cartridges 107, a carriage shaft 108, a guide rail 109, a motor 110, a timing belt 11, and a pair of timing pulleys 12, 13. The platen roller, the carriage shaft 108, and the guide rail 109 extend parallel with each other in a widthwise direction indicated by an arrow D. The carriage 106 is mounted on the carriage shaft 108 and is slidable as guided by cooperative operation of the joint portion 106a and the guide rail 109. The print head 105 and the ink cartridges 107 are detachably mounted on the carriage 106 such that the nozzle surface 105a of the print head 105 faces the platen roller 103.

The carriage 106 is fixedly attached to the timing belt 111 which is wound around the pair of timing pulleys 112 and 113. When the carriage motor 110 drives the timing pulley 112, the timing belt 111 carries the carriage 106 in the widthwise direction D.

Although not shown in the drawings, the ink jet printer 1 further includes a sheet cassette storing a stack of recording sheets 104. A recording sheet 104 is fed one at a time through a sheet supply opening in a direction indicated by an arrow A. Rotation of the platen roller 103 conveys the recording sheet 104 in a direction indicated by an arrow B while the recording sheet 104 is maintained in contact with the print head 105. The recording sheet 104 is further conveyed in a direction indicated by an arrow C and discharged out of the print unit 21.

Also, the nozzle surface 105a of the print head 105 is formed with four rows of ink jet nozzles. Each row includes 64 ink jet nozzles aligned at a 1/180 inch interval in a lengthwise direction perpendicular to the widthwise direction D. The ink cartridges 107 store a corresponding colored ink, that is, yellow (Y), magenta (M), cyan (C), and black (K) inks. Each of the ink cartridges 107 is in a fluid connection with a corresponding row of ink jet nozzles of the nozzle surface 105a for supplying ink to the print head 105. The print head 105 ejects ink droplets through selective ink jet nozzles, toward the recording sheet 4 supplied between the nozzle head 105a and the platen roller 103, thereby forming a dot image on the recording sheet 4.

The print unit 21 prints images using a well known interlace printing method wherein a number of passes is determined according to a resolution in the sheet feed lengthwise direction of the recording sheet 104. For example, when the resolution in the lengthwise direction is set to 360 dpi, a two-pass interlace printing method is used (360 dpi/180 inch=2 passes). When the resolution in the lengthwise direction is set to 720 dpi, then a four-pass interlace printing method is used (720 dpi/ 180 inch=4 passes). It should be noted that the number of passes indicates how many dot lines each ink jet nozzle forms by reciprocally moving across the recording sheet before the recording sheet 104 is transported by a predetermined amount.

Next, the RAM 33 will be described while referring to FIGS. 3 and 4. The RAM 33 has an overall memory capacity of 3 MB, or more accurately 2048 KB. The RAM 33 is divided into a work area 33a, a shared area 33b, and an allocated area 33c, which is allocated exclusively for print processes. The work area 33a has a capacity of 0.4 MB, or more accurately 396 KB. The allocated area 33c has a capacity of 5.0 MB, or more accurately 480 KB. The shared area 33b has the remaining capacity of 1.1 MB, or more accurately 1172 KB. The shared area 33b is used as a reception buffer for facsimile reception, as a voice recording area for the answering machine function, as a data process area for processing data during print processes, such as the video print process.

In order to execute the video print process, the multifunction printing device 1 needs to secure a required amount of buffer area in the RAM 33. The buffer area required for the video print process is determined by a designated resolution and by the number of ink jet nozzles used during printing. Because the RAM 33 has the above-described memory limitations, four different resolutions can be used during the video print process: width×length resolutions of (360×360) dpi, (360×720)dpi, (720×720) dpi, and (1440×720) dpi. When the resolution is set to (360×360) dpi or (360×730) dpi, all of the 64 ink jet nozzles of the print head 105 can be used. However, because of memory limitations of the RAM 33, only 32 of the 64 ink jet nozzles can be used when the resolution is set to (720×720) dpi, and only 16 can be used when the resolution is set to (1440×720) dpi.

Figure 3:
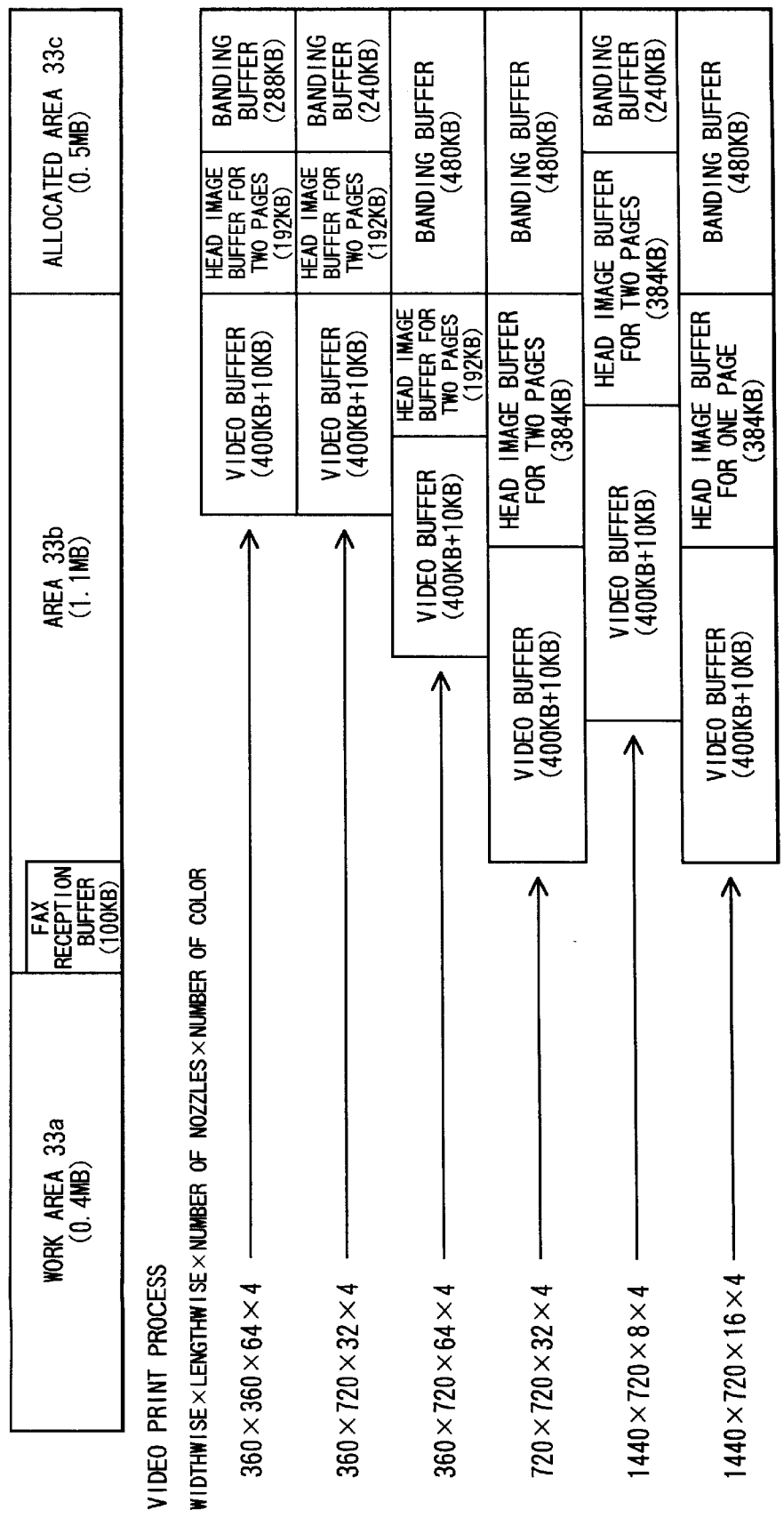
FIG. 3 is a graphical representation of RAM memory requirements during a video print routine, for different resolutions and different numbers of nozzles to be used.

As shown in FIG. 3, the buffer area required for the video print process includes a banding buffer, a head image buffer, and a video buffer. The banding buffer has a capacity corresponding to the lengthwise resolution, and is secured in the allocated area 33c. The head image buffer has a capacity corresponding to the widthwise resolution. The head image buffer is also normally secured in the allocated area 33c, except when capacity of the allocated area 33c is insufficient for both the banding buffer and the head image buffer, whereupon a portion of the head image buffer is secured in the shared area 33b adjacent to the allocated area 33c. The video buffer has a predetermined capacity of 410 KB and is always secured in the shared area 33b adjacent to the head image buffer.

In the same manner, in order to execute the copy process, the multifunction printing device 1 needs to secure a required buffer area in the RAM 33. The area required for the copy process is determined by a designated resolution and by the number of ink jet nozzles used during printing. In this case also, it is possible to set four different resolutions: a width×length resolutions of (360×360) dpi, (360×720) dpi, (720×720) dpi, and (1440'720) dpi. All 64 ink jet nozzles can be used when the resolution is set to (360×360) dpi, (360'730) dpi, or (720×720) dpi. However, only 36 of the ink jet nozzles can be used when the resolution is set to (1440×720) dpi.

Figure 4:
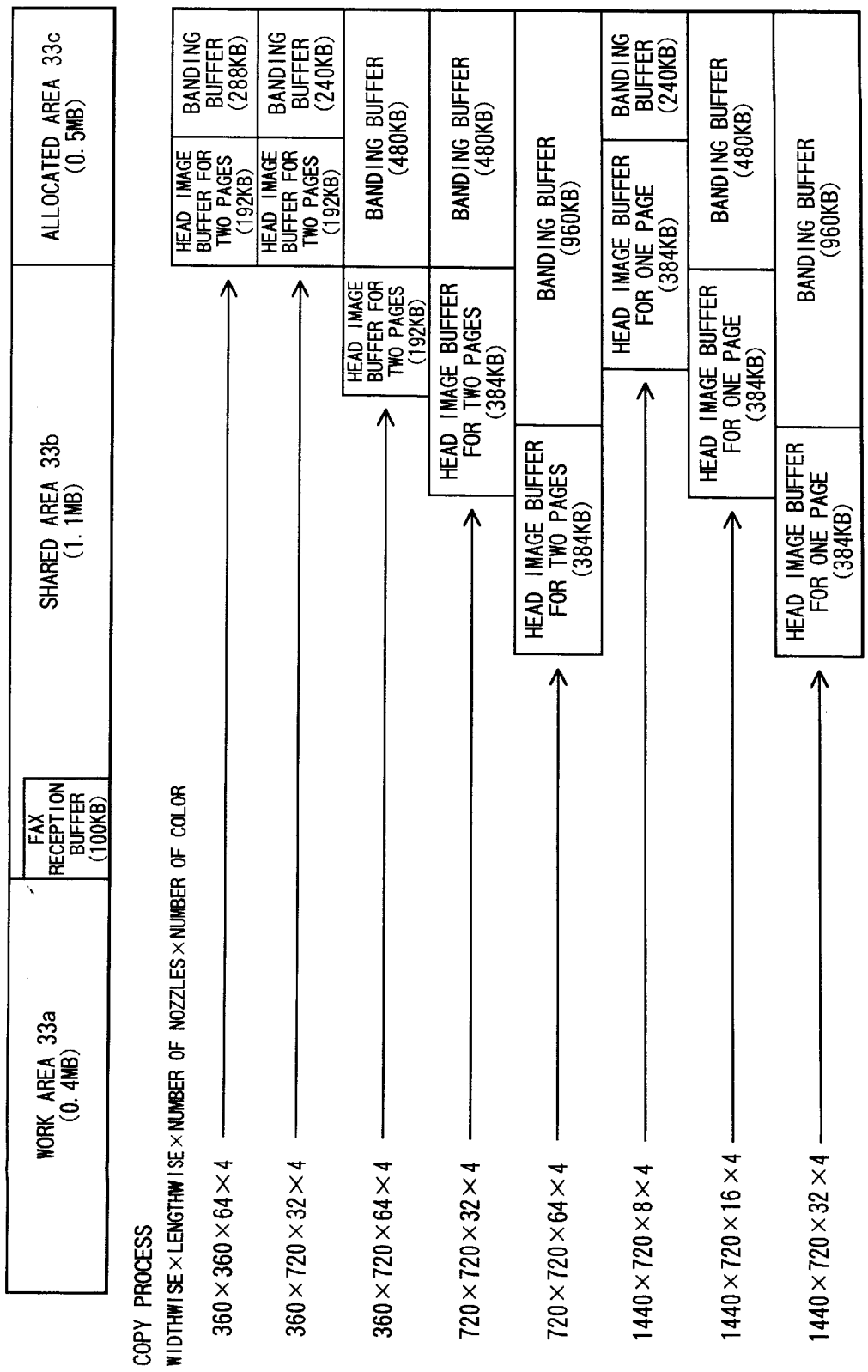
FIG. 4 is a graphical representation of RAM memory requirements during a copy process, for different resolutions and numbers of nozzles to be used.

As shown in FIG. 4, the buffer area required for the copy process includes a banding buffer having a capacity corresponding to the lengthwise resolution, and a head image buffer having a capacity corresponding to the widthwise resolution. The banding buffer is secured totally in the allocated area 33c if possible, or partially in the allocated area 33c and partially in the shared area 33b if necessary. Then, the head image buffer is secured in the allocated area 33c if available and also the shared area 33b if necessary.

It should be noted that the banding buffer needs to have a capacity capable of storing on additional subsequent single pass's worth of data.

The ROM 31 stores a Table 1 and a Table 2 as shown in FIGS. 5(a) and 5(b). The Table 1 numerically indicates relationship between free space required in the shared area 33b, various resolutions, and numbers of ink jet nozzles used during video print process. Table 2 indicates a relationship between free space required in the shared area 33b, various resolutions, and numbers of ink jet nozzles used during the copy print process.

Figure 6:
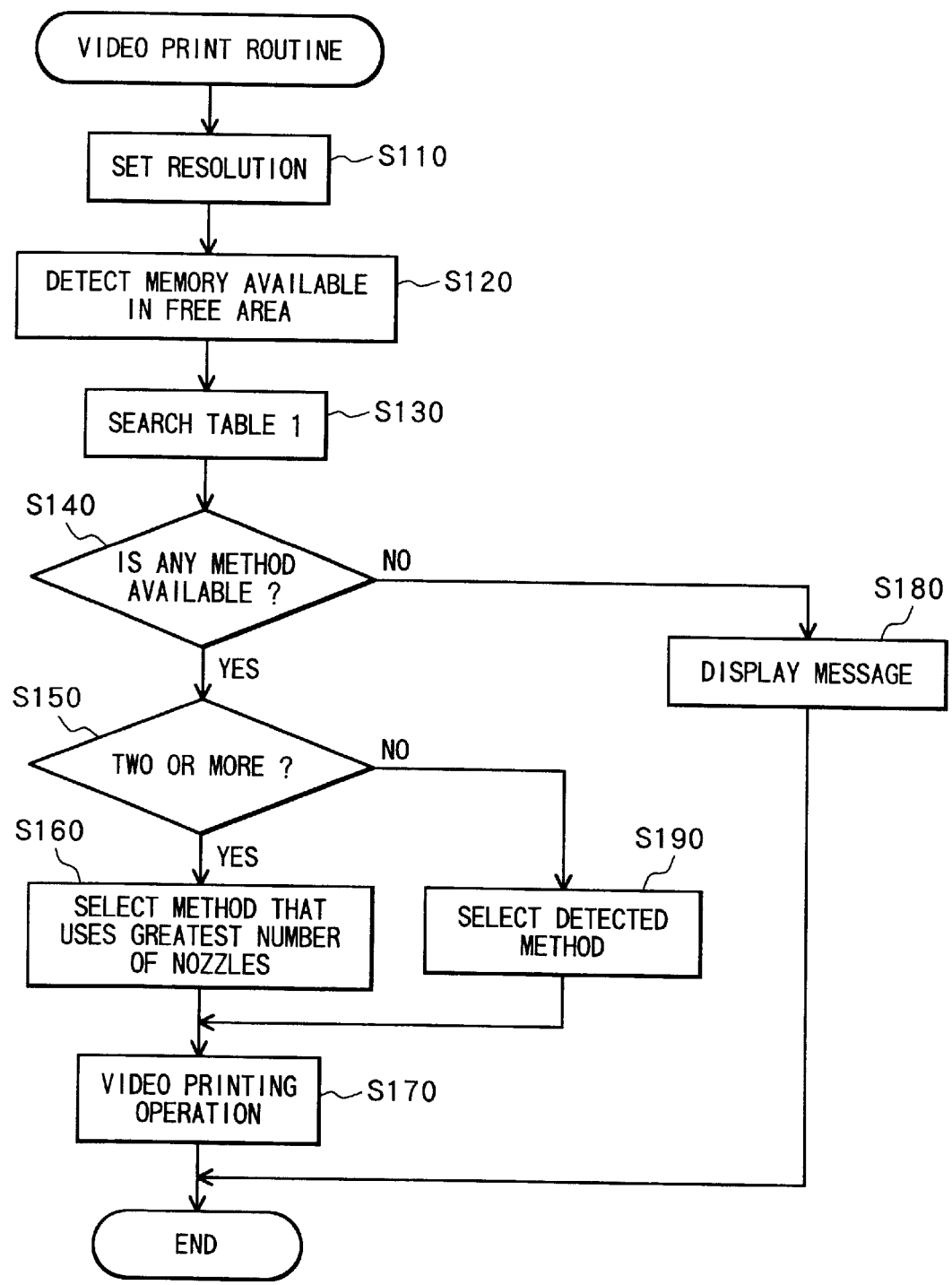
FIG. 6 is a flowchart representing the video print routine.

Next, the video print routine will be described while referring to the flowchart shown in FIG. 6. The video print routine is executed when a video device is connected to the video input terminal 13 and the video print function is selected by a user appropriately manipulating the operation panel 23.

When the video process is started, first in S110, the resolution of the video print is set according to input made by the user using the operation panel 23. Next in S120, amount of a free space in the shared area 33b in the RAM 33 is detected. In S130, the set resolution and the detected amount of the free space in the shared area 33b are set as parameters, and Table 1 is searched. Next in S140, it is determined whether or not there is any interlace printing method that matches the set parameters. That is, it is determine whether or not there is an interlace printing method for printing at the designated resolution, that requires a memory amount equal to or less than the free space detected in S130 as available in the sheared area 33b. If so (YES:S140), then S150, it is determined whether or not two or more interlace printing methods are listed in Table 1. If so (YES:S150), then in S160, the interlace printing method that uses the greatest number of ink jet nozzles is selected. Then, a video printing operation is executed in S170 using the selected interlace printing method, and the present process is ended.

If it is determined in S140 that no matching interlace printing method is listed in Table 1 (NO:S140), then the program proceeds to S180 wherein the display 25 displays a message to inform the user that the printing operation cannot by performed at the designated resolution. Then, the present process is ended. If it is determined in S150 that only one matching interlace printing method is listed (NO:S150), then in S190, the one interlace printing method is selected, and the program proceeds to S170.

It should be noted that in the printing operation, the image data is processed into print data in accordance with the selected interlace printing method while being stored in the free space of the RAM 33. Then, printing is performed for forming an image on a recording sheet 104 based on the print data.

For example, when a resolution of (360×720) dpi is designated, and the actual amount of the free space in the shared area 33b is 602 KB or more, then the interlace printing method that uses 64 ink jet nozzles will be selected. On the other hand, when the actual amount of free space in the shared area 33b is less than 602 KB and equal to or greater than 410 KB, then the interlace printing method that uses 36 ink jet nozzles will be selected. However, when the actual amount of the free space in the shared area 33b is less than 410 KB, there is no matching interlace printing method, so the message is displayed to indicate that the printing operation cannot be performed because of insufficient memory.

Figure 7:
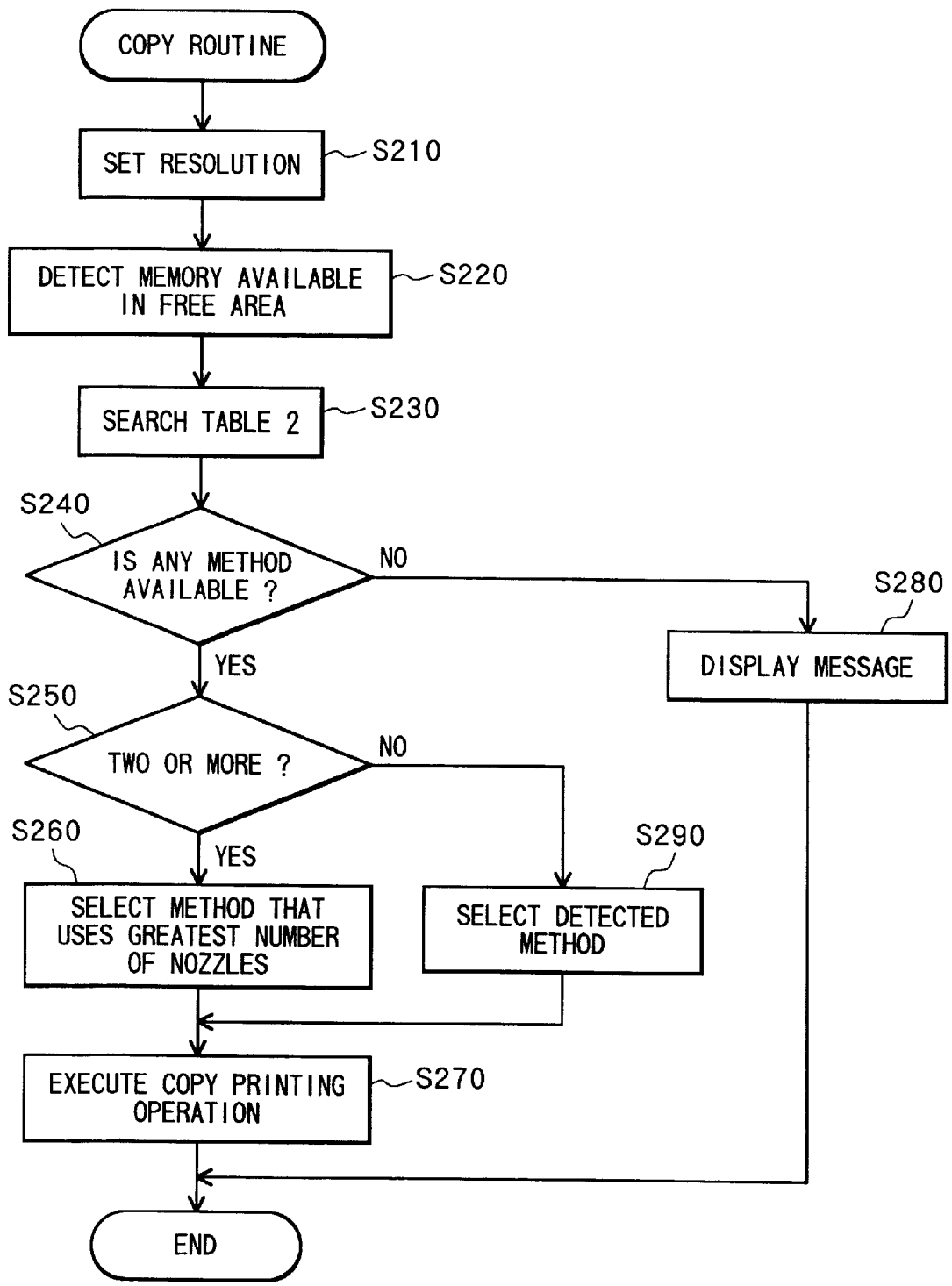
FIG. 7 is a flowchart representing the copy routine.

Next, the copy process will be described while referring to the flowchart shown in FIG. 7. The copy process is executed when an original document is set in the image scanner 15 and the copy function is selected by a user using the operation panel 23.

When the copy process is started, first in S210, a resolution is set according to an input made by the user using the operation panel 23. Then in S220, the amount of the free space in the shared area 33b of the RAM 33 is detected. Then, in S230, the designated resolution and the detected free space amount are set as parameters, and Table 2 is searched. Next in S240, it is determined whether or not any matching interlace printing method is listed in Table 2. That is, it is determined whether or not an interlace printing method for printing at the designated resolution is listed with a memory requirement equal to or less than the free space amount detected in S220. If so (YES:S240), then it is determined in S250 whether or not there is more than one matching interlace printing method. If so (YES:S250), then in S260, the interlace printing method that uses the greatest number of ink jet nozzles is selected. Then in S270, a copy printing operation is executed using the selected interlace printing method. At this time, an image retrieving process for retrieving images from the original document is performed concurrent with an image forming process for forming an image on an recording sheet 104. Then, the present process is ended.

On the other hand, if it is determined in S240 that no matching interlace printing method is listed in Table 2 (NO:S240), then is S280, the display 25 displays a message to inform the user than the printing operation cannot be performed at the designated resolution. Then, the present process is ended.

If it is determined in S250 that only one matching interlace printing method is listed (NO:S250), then in S290, he one interlace printing method is selected. Then, the program proceeds to S270 for executing the printing operation using the selected interlace printing method.

For example, when a resolution of (1440×720) dpi is designated, and the actual amount of the free space in the shared area 33*b* is 844 KB or greater, then the interface printing method that used 32 ink jet nozzles is selected. On the other hand, when the actual amount of the free space in the shared area 33*b* is less than 860 KB and greater or equal to 384 KB, the interlace printing method that uses 16 ink jet nozzles is selected. When the actual amount of the free space in the shared area 33*b* is less than 384 KB and equal to or greater than 144 KB, the interface printing method that uses 8 ink jet nozzles is selected. However, when the actual amount of free space in the shared area 33*b* is less than 144 KB, the printing operation cannot be performed because of insufficient memory.

As described above, according to the present invention, it is determined whether or not the RAM 33 has sufficient free space in the shared area 33*b*. If so, an interlace printing method that uses a maximum possible number of ink jet nozzles is determined according to the amount of a free space in the shared area 33*c*. Therefore, the printing operation will not be concurrently performed at an undesignated resolution. Also, because the interlace printing method that uses the greatest number of ink jet nozzles is selected, printing can be performed as rapidly as possible.

While the invention has been described in detail with reference to specific embodiments thereof, it would be apparent to those skilled in the art that various changes and modifications may be made therein without departing from the spirit of the invention, the scope of which is defined by the attached claims.

For example, a multicopy process can be executed in the same manner ad described above. The multicopy process is for forming a plurality of copies from a single original document. In this case, an additional table can be stored in the ROM 31. The table indicates relationship between a required amount, and a resolution and a number of ink jet nozzles to be used. Also, tables for other types of processed required to use the shared area 33*b* of the RAM 33 can be stored in the ROM 31 so that processes can be executed in the same manner.

What is claimed is:

1. A multifunction printing device comprising:
    a sheet feed unit that feeds a recording medium in a first direction;
    a printer that executes printing operations using an interlace printing method to form an image on the recording sheet, the printer including a transport unit and a print head, the transport unit reciprocally moving the print head in a second direction perpendicular to the first direction, the print head having a nozzle surface formed with a plurality of ink jet nozzles aligned in a row at a predetermined pitch in the first direction, wherein the printer forms the image by selectively ejecting ink droplets from the ink jet nozzles toward the recording sheet;
    a first memory that stores data;
    a receiving unit that receives the data;
    a specify unit that specifies a resolution;
    a detection unit that detects an amount of free space in the first memory;
    a selecting unit that selects the interlace printing method in accordance with both the amount of the free space detected by the detection unit and the resolution specified by the specify unit; and
    a process unit that processes, using the first memory, the data received by the receiving unit based on the interlace printing method selected by the selecting unit, wherein
    the printer executes the printing operations at the resolution based on the data processed by the process unit.

2. The multifunction printing device according to claim 1, wherein the selecting unit comprises a second memory and a searching unit, a second memory storing a plurality of interlace printing methods each in association with a required amount of a free space in the first memory, a number of ink jet nozzles to be used, and the resolution, the searching unit searching out, from the second memory, the interlace printing method which is in association with the resolution specified by the specify unit and with a required amount which is less than the amount detected by the detection unit.

3. The multifunction printing device according to claim 2, wherein when the searching unit searches out more than one interlace printing methods, one of the interlace printing methods that uses the greatest number of ink jet nozzles is selected.

4. The multifunction printing device according to claim 1, wherein the interlace printing method selected by the selecting unit specifies a number of ink jet nozzles to be used.

5. A method of controlling a multifunction printing device, comprising the steps of:
    (a) specifying a resolution;
    (b) receiving image data;
    (c) detecting amount of a free space of a first memory;
    (d) setting the resolution specified in step (a) and the amount of the free space detected in step (c) as parameters;
    (e) searching out one of interlace printing methods stored in a second memory based on the parameters; and
    (f) processing the image data received in step (b) into print data using the first memory based on the interlace print method searched out in step (d).

6. The method according to claim 5, further comprising the step of (g) forming an image on a recording sheet based on the print data using a print unit including a print head formed with a row of ink jet nozzles aligned at a predetermined pitch, wherein the image is formed at the resolution specified in step (a) in the interlace printing method searched out in step (e).

7. The method according to claim 5, wherein in step (e), one of the interlace printing methods which is in association with the resolution specified in step (a), a required amount less than the amount detected in step (c), and a corresponding number of ink jet nozzles to be used is selected.

8. The method according to claim 5, wherein if more than one interlace printing methods are searched out in step (e), one of the interlace printing methods which is in association with the greatest number of ink jet nozzles is selected.

9. The method according to claim 5, further comprising the step of (h) if no interlace printing method is searched out in step (e), displaying a message notifying a user that an image forming cannot be performed at the resolution specified, without executing step (f).

10. A medium storing a program of controlling a multi-function printing device, the program comprising the program of:

(a) specifying a resolution;

(b) receiving image data;

(c) detecting amount of a free space of a first memory;

(d) setting the resolution specified in program (a) and the amount of the free space detected in program (c) as parameters;

(e) searching out one of interlace printing methods from a second memory based on the parameters; and (f) processing the image data received by receiving program (b) and converting the data into print data using the first memory based on the interlace print method searched out by the searching program (a).

11. The medium according to claim 10, wherein in the searching program (e), one of the interlace printing methods stored in association with the resolution specified by specifying program (a), a required amount less than the amount detected by detecting program (c), and a number of ink jet nozzles to be used is searched out.

12. The medium according to claim 11, wherein the program further comprising the program of (g) forming an image on a recording sheet based on the print data using a print unit, the print unit including a print head formed with a plurality of ink jet nozzles aligned in a row at a predetermined pitch, wherein the image is formed at the resolution specified by the specifying program (a) in the interlace printing method searched out in the searching program (e).

13. The medium according to claim 10, wherein if more than one interlace printing methods are searched out by the searching program (e), one of the interlace printing methods which is in association with the greatest number of ink jet nozzles is selected.

14. The medium according to claim 10, wherein the program further comprises the program of (h) if no interlace printing method is searched out by the searching program (d), displaying a message notifying user that an image forming cannot by performed at the resolution specified, without executing forming program (d).

15. A printing device comprising:

a sheet feed unit that feeds a recording medium in a first direction;

a printer that executes printing operations using an interlace printing method to form an image on the recording sheet, the printer including a transport unit and a print head, the transport unit reciprocally moving the print head in a second direction perpendicular to the first direction, the print head having a nozzle surface formed with a plurality of ink jet nozzles aligned in a row at a predetermined pitch in the first direction, wherein the printer forms the image by selectively ejecting ink droplets from the ink jet nozzles toward the recording sheet;

a first memory that stores data;

a second memory that stores a plurality of interlace printing methods;

a receiving unit that receives the data;

a specify unit through which a user inputs a desired resolution;

a detection unit that detects an amount of a free space in the first memory;

a selecting unit that selects one of the interlace printing methods stored in the second memory in accordance with both the amount of the free space detected by the detection unit and the desired resolution inputted through the specify unit; and a process unit that processes, using the first memory, the data received by the receiving unit based on the interlace printing method selected by the selecting unit, wherein the printer executes the printing operations at the desired resolution based on the data processed by the process unit.

16. A method of selecting one of interlace printing methods used in a device including a plurality of printing elements aligned in a line at a predetermined pitch, the device executing printing operations by selectively driving the plurality of printing elements based on an interlace printing method, comprising the steps of;

specifying a resolution;

detecting an amount of free space in a first memory which is utilized for processing printing data; and selecting one of interlace printing methods stored in a second memory in accordance with the resolution and the amount of the free space in the first memory.

* * * * *